Figure 1:
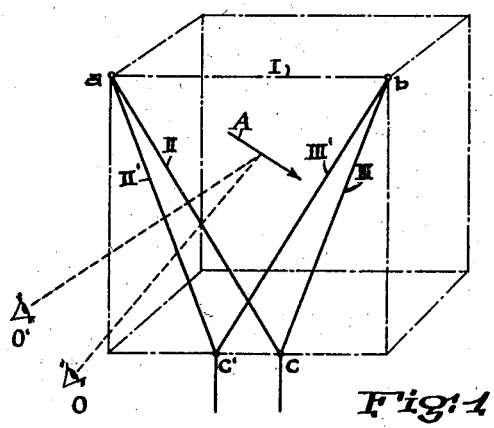

Nov. 18, 1941.    H. E. HOLLMANN    2,262,936
ELECTROCARDIOGRAPH
Filed Nov. 24, 1937    2 Sheets-Sheet 1

INVENTOR.
Hans Erich Hollmann
BY
ATTORNEY.

Nov. 18, 1941.          H. E. HOLLMANN          2,262,936
                        ELECTROCARDIOGRAPH
                    Filed Nov. 24, 1937        2 Sheets-Sheet 2
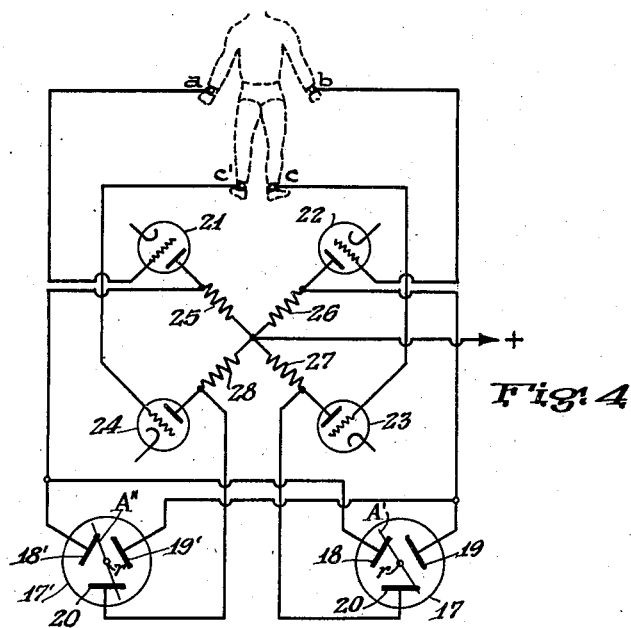
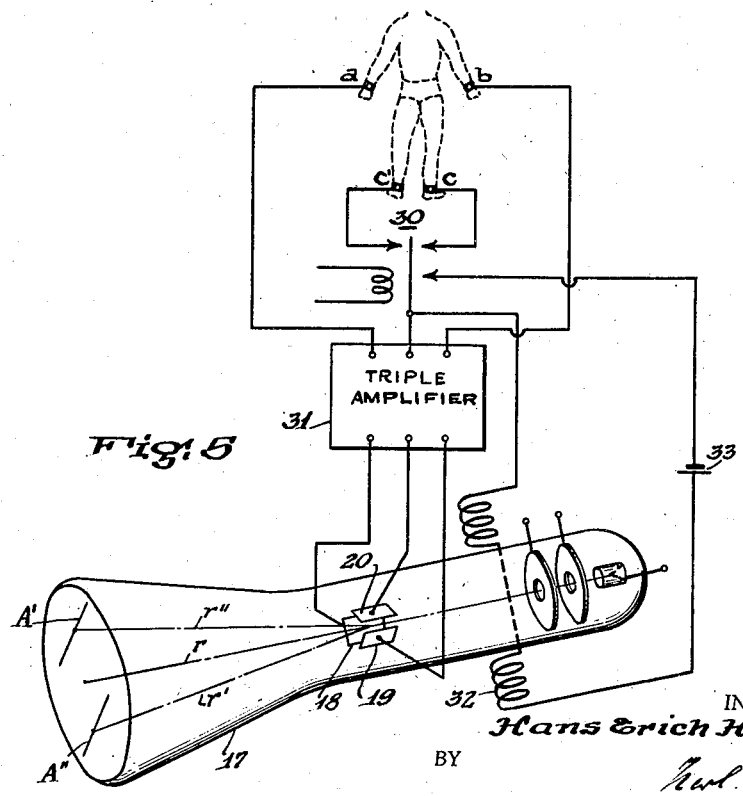
INVENTOR.
Hans Erich Hollmann
BY
ATTORNEY.

Patented Nov. 18, 1941

2,262,936

UNITED STATES PATENT OFFICE 2,262,936

ELECTROCARDIOGRAPH

Hans Erich Hollmann, Berlin-Lichterfeld, Germany, assignor to Radio Patents Corporation, New York, N. Y., a corporation of New York Application November 24, 1937, Serial No. 176,218
In Germany December 3, 1936

4 Claims. (Cl. 128—2.06)

My invention relates to electro-cardiographs, more particularly to a novel method of and a system for indicating and/or recording the minute action potentials generated in the human body by the action of the heart, and among the objects of the invention is the provision of a recording system and method adapted to indicate directly the position and rotation in three dimensional space of the so-called electrical axis of the heart during a heart beat or action cycle. Since the electrical axis of the heart is in a first approximation coincident with the heart's anatomical axis, valuable data and information about the condition and function of the heart may be gathered from electro-cardiograms of this character.

In my copending application, Serial No. 148,326, filed June 15, 1937, I have described a system and method for visually indicating and/or recording the form, direction and variations of the electrical axis of the heart in a human or animal organism during an individual heart beat or action cycle. According to this method, the potentials derived from several preferably three "heart leads" obtained by tapping the body at three points substantially equi-distant from the heart by means of suitable electrical connectors, such as according to the well known Einthoven tapping system, are vectorially combined at angles of 60° to form a resultant potential vector by means of a special cathode ray oscillograph having three electrostatic deflecting systems or magnetic deflecting coils oriented at angles of 60° relative to each other and acting upon an electron ray produced in a suitable manner and impinged upon a fluorescent recording screen. As is shown and described in said copending application, the resultant deflection of the cathode ray and as a result thereof of the luminescent recording spot produced upon the fluorescent screen, at each instant represents the instantaneous magnitude and direction of the electrical axis or resultant vector of the biological action potentials generated in the muscular system of the heart during an action or heart beat cycle.

Since the position of the electrical axis is determined by the propagation of the exciting action within the heart muscular system, a closed curve is obtained upon the fluorescent recording screen of the cathode ray oscillograph similar to a Lissajou figure known from the oscillographic recording arts, the study of which curve will reveal important and valuable data to the practicing physician about the condition and function of the heart.

There is further shown and described in said copending application, a system for carrying out the novel method comprising three amplifiers with their cathodes connected to ground or any other potential reference point and serving to increase the minute potentials obtained from the three "heart leads" to a value sufficient for effecting the deflection of the cathode ray of the recording oscillograph. The novel feature of this amplifier consists essentially in the connection of both its input and output circuits in star fashion whereby the further advantages are obtained that all three amplifiers may be fed from a common high potential source and that interference from outside sources such as disturbing electric or magnetic fields is substantially eliminated or reduced to a minimum on account of the differential action in each of the three "heart lead" or control circuits.

As is understood, a system as described in said copending application is capable of producing only a two dimensional image of the heart vector which image is the projection of the heart vector upon a plane containing the three tapping points; that is, the frontal plane when using "heart leads" derived from the arms and legs according to the Einthoven system. This representation of the heart vector in frontal projection presents only an indirect picture of the actual conditions or position of the resultant heart vector due to the fact that the heart axis is not always parallel to the frontal plane, but in the majority of cases forms an angle therewith.

In order to determine the actual position and rotation in space of the heart vector during a heart beat or action cycle, it has already been suggested to produce a second component of the heart vector by projection upon a separate plane, preferably the so-called sagittal plane which is at right angle to the frontal plane, in addition to the normal image obtained by the frontal projection of the heart vector. By combination of the two vector components a three-dimensional impression of the heart axis or its actual position in space may be obtained. To produce an image of the heart axis in the sagittal plane from potentials derived in a known manner from the arms and legs is considerably more difficult than to produce an image in frontal projection as described in the copending application. Another drawback of producing a sagittal plane component by an Einthoven tapping system is the fact that a certain arbitrariness is involved in such a method liable in most cases to lead to substantial errors and false records with fatal consequences for the patient.

By the novel method and system according to the present invention, the instantaneous position and rotation of the heart vector in three-dimensional space can be determined in a most simple and easy manner without the difficulties and drawbacks inherent in previous methods and attempts. In accordance with the present invention, a pair of stereoscopic images are derived from the ordinary "heart leads" or tapping points lying within a single plane, preferably the frontal plane, in accordance with the Einthoven tapping system.

Figure 2:
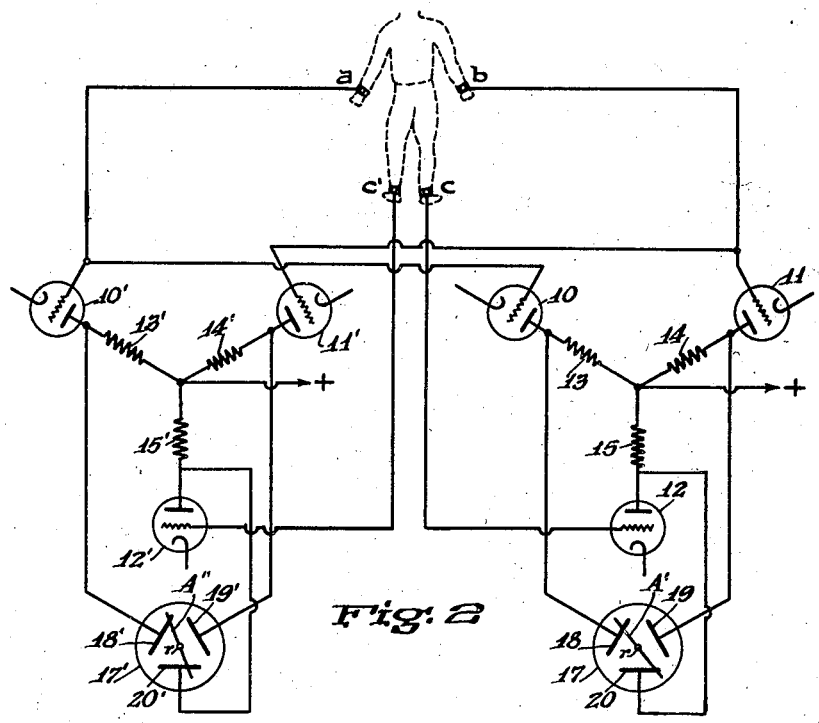
Figure 3:
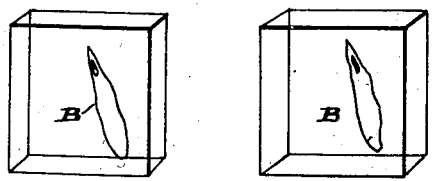

The above and further objects and advantages of the invention will become more apparent from the following detailed description taken with reference to the accompanying drawings forming part of this specification and wherein Figure 1 is a diagram explanatory of the function of and principle underlying the invention; Figure 2 shows a circuit diagram for a recording apparatus constructed in accordance with the invention; Figure 3 illustrates a pair of "heart curves" as obtained by the invention to be observed through a stereoscopic viewing device; Figure 4 shows a modification of a system according to Figure 2; Figure 5 illustrates a further modification of the invention for producing stereoscopic "heart images."

Similar reference characters have been used to denote similar elements in the different views of the drawings.

Referring to Figure 1, the cube shown is assumed to define a space enclosing the heart in a human or animal organism. The heart vector A, that is, the vectorial resultant of all the biological or action potentials generated in the heart at a definite instant during a heart beat or action cycle, is positioned approximately at the center of this cube and in the example illustrated points towards the bottom on the right; that is, in the body it will point towards the bottom on the left. By the four tapping points $a, b, c, c'$ two tapping triangles are defined upon the frontal plane or the front surface of the cube. The shape of these triangles is no longer exactly equi-lateral as in the case of the above mentioned copending application, but they are slightly distorted by the displacement of the lower corners $c$ and $c'$ towards the left and right, respectively.

The result of the above deviations of the triangles $abc$ and $abc'$ from an equi-lateral triangle will be that the vector diagrams obtained from the two tapping triangles by vectorial combination of the separate projections of the heart vector A upon the individual sides I, II, III and I, II', III' of the triangles, will also slightly deviate from each other. These vector diagrams or curves in case of a single heart vector as shown representing the instantaneous value and position merge into a line as shown in the drawing. In accordance with simple geometrical laws readily understood from the diagram, this deviation or different orientation is such as if the heart vector A were projected at different angles upon the frontal plane of the cube containing the tapping triangles $abc$ and $abc'$, respectively. In other words, the two vectors produced upon the fluorescent screen of the cathode ray oscillograph and derived from the triangles $abc$ and $abc'$, respectively, are such as if the vector A were viewed from two different directions; that is to say, from a point O on the one hand and a separate point O' spaced therefrom on the other hand. The two potential vectors obtained on the principle of the copending application are therefore of a stereoscopic character and when viewed through a stereoscopic viewing device will produce a three-dimensional impression of the actual position of the potential vector A within the body.

In order to carry the stereoscopic representation of the heart vector into practice, the tappings or "heart leads" from the arms and legs may be used in which case the triangle $abc$ is preferably formed by the leads from the right arm, the left arm and the left leg and the triangle $abc'$ is formed by leads from the right arm, left arm and the right leg, as shown in the following illustrations.

A complete recording arrangement designed on the above basis is shown in Figure 2. The latter comprises two complete recording systems of the type described in my copending application, each system serving for producing a record upon the screen of a cathode ray oscillograph derived from three "heart leads" or tapping points $abc$ and $abc'$, respectively. The first system in the example shown comprises three amplifiers illustrated by the triodes 10, 11 and 12. The grids of the latter are connected to the tapping points $a$, $b$ and $c$. The anode circuits include coupling or load impedances 13, 14 and 15, respectively, connected to a common star point connected to the positive pole of a high tension source for all three tubes as indicated by the plus symbol in the drawings the negative electrode of the high tension source being connected to the cathode in the usual manner (not shown). The amplified potential variations developed at the anodes of the tubes are impressed upon corresponding triple deflecting plates 18, 19 and 20 arranged symmetrically around the electron ray $r$ of a cathode ray oscillograph 17 in substantially the same manner as described in my copending prior application. In this manner a record A' of the heart vector or axis is obtained upon the luminescent screen of the cathode ray oscillograph. A similar vector A" slightly inclined and displaced relative to the vector A' is produced upon the luminescent screen of a separate cathode ray tube 17' controlled through an amplifier connected with the second tapping triangle $abc'$ in substantially the same manner as the amplifier for the oscillograph 17, like parts of the two amplifying channels being denoted by like and primed reference numerals. Thus, if the two images A' and A" are viewed through a stereoscopic viewing device, a three-dimensional impression will be obtained of the actual position of the heart vector or axis as explained and described hereinabove. Since the heart vector during a complete heart beat or action cycle constantly changes its position, a closed "heart curve" or image in place of a line is obtained in practice. As is understood, the amplifiers shown may comprise any desired number of stages and may be designed in any known manner, a single stage being shown only for clearness and simplicity of illustration.

In Figure 3 I have shown a pair of such "heart curves" B and B' for a normal heart obtained with an apparatus constructed according to the invention. In order to facilitate the stereoscopic accommodation of the eyes of the observer, the two curves are shown enclosed in a pair of stereoscopic cubes. If the latter are viewed through a stereoscope it will be seen that the center of the diagram coincides with the rear wall of the cube and that its main axis has a direction from the rear towards the front to the right.

As is understood, the circuit arrangement and system according to Figure 2 is susceptible of many modifications and variations, some of which are described in the following and have the advantage of reducing the number of amplifying tubes and other parts required. Thus, referring to Figure 4 there is shown a recording system requiring only four amplifiers 21, 22, 23 and 24 instead of six amplifiers as according to Figure 2. In the example illustrated, the grids of the amplifiers 21, 22 are connected to the tapping points $a$ and $b$ and the grids of the amplifiers 23, 24 are connected to the tapping points $c$ and $c'$, respectively. The anode circuits of the tubes include load impedances such as ohmic resistors 25, 26, 27 and 28, respectively, all connected to a common star point serving for supplying anode potential from a common source, as in the case of Figure 2. The amplified potential variations developed at the anode of amplifier 21 are impressed simultaneously upon the corresponding deflecting plates 18 and 18' of the cathode ray oscillographs 17 and 17'. The potential variations developed at the anode of amplifier 22 are similarly impressed upon the corresponding deflecting plates 19 and 19' of the cathode ray oscillographs 17 and 17', while the potential variations developed at the anodes of the amplifiers 23 and 24 are impressed upon the remaining deflecting plates 20 and 20', respectively, of the oscillographs in the manner shown in the drawings.

As is readily understood, in an arrangement of this type, the record or curve A' produced upon the screen of the oscillograph 17 is derived from the potentials at the tapping points $abc$ and the record or curve A'' is derived from the potentials at the tapping points $abc'$ in substantially the same manner as in the case of Figure 2 without mutual interference or interaction between the two recording systems. Both records may be viewed through a stereoscopic viewing device in a manner similar to that described hereinbefore.

Referring to Figure 5, there is shown a modification of a stereoscopic recording system requiring a single cathode ray tube only. For this purpose the electron ray $r$ of the tube is deflected or swept periodically from one mean position $r'$ at one end of the screen to another mean position $r''$ at the opposite end of the screen such as by means of a magnetic deflecting coil or the equivalent through which are passed intermittent sweeping current impulses from a source 33 produced by the aid of an interrupter or oscillating armature of an electro-mechanical vibrator 30. Item 31 represents a single triple amplifier of the type shown in Figure 2 and disclosed in my copending application. The output of the amplifier is connected to the triple deflecting plate system of the oscillograph in a manner similar to that described hereinbefore, while the input is alternately connected in synchronism with the sweeping of the electron ray to the tapping system $abc'$ at one time and to the tapping system $abc''$ at another time by the aid of the vibrator 30. In this manner a pair of separate spaced records A' and A'' are obtained upon the same fluorescent screen of the cathode ray oscillograph in a manner substantially similar to that as described hereinbefore which when viewed through a stereoscope will yield a three-dimensional impression of the actual position and/or rotation of the electrical vector or axis of the heart. As is understood, the sweeping frequency of the cathode ray should be substantially higher than the frequency of the heart beat cycles in order to obtain a continuous indication of both stereoscopic images.

As will be evident from the above, the invention is not limited to the specific arrangements and steps disclosed and described herein for illustration, but the novel principle and underlying inventive concept are susceptible of numerous modifications and variations coming within the broad scope and spirit of the invention as defined in the appended claims. Accordingly the drawings and specification are to be regarded in an illustrative rather than a limiting sense.

I claim:

1. An electro-cardiographic system comprising means for drawing action potentials from both arms and both legs of a patient, a triple amplifier, switching means for alternately connecting the leads from both arms and one leg and the leads from both arms and the other leg to the input circuits of said amplifier at a rate which is high compared with the rate of variation of the action potentials, a cathode ray oscillograph comprising electron gun means to produce a concentrated electron beam and a luminescent screen impinged by said beam, a triple deflecting system adapted to deflect the electron beam in directions oriented at angles of 60° relative to each other, said deflecting system being connected to the outputs of said amplifier, and means for sweeping the cathode ray from one mean position to another mean position synchronously with the switching of the input circuits of said amplifier, to produce two images of the resultant heart potential vector on said screen related to and spaced from each other at a distance adapted for observation of the spacial position of the resultant heart vector in a stereoscopic device.

2. In electro-cardiography, the method of producing a first record of the resultant heart potential vector by vectorially combining the potentials drawn from three separate points forming the corners of a triangle with the heart located in the center thereof, simultaneously producing a second record of the heart potential vector by likewise vectorially combining the potentials drawn from three separate points, two of which coincide with two corners of said triangle while the third is relatively displaced with regard to the third corner of and lying substantially within the plane of said triangle, and observing both said records relatively arranged as the component images in a stereoscopic device.

3. In an electro-cardiographic system, leads for drawing action potentials from four points two of which form a common base of and the other two form the third corners of a pair of slightly displaced tapping triangles arranged in substantially the same plane, a triple amplifier, switching means for alternately connecting the leads from said base and either of the remaining leads to the input circuits of said amplifier at a rate which is high compared with the rate of variation of the action potentials, a cathode ray oscillograph comprising electron gun means to produce a concentrated electron beam and a luminescent screen impinged by said beam, a triple deflecting system adapted to deflect the electron beam in directions oriented at substantially 60° relative to each other, said deflecting system being connected to the outputs of said amplifier, and means for sweeping the cathode ray from one mean position to another mean position synchronously with said switching means, to produce two images of the resultant heart potential vector on said screen related to and spaced from each other at a distance as to enable observation of the spacial position in three-dimensional space of the resultant heart vector in a stereoscopic device.

4. In electro-cardiography, the method of producing a first polar diagram of the resultant heart potential vector by vectorially combining at angles of substantially 60° the voltages drawn between each two tapping points on the two arms and one of the legs of a patient, simultaneously producing a second polar diagram of the heart potential vector by similarly vectorially combining the voltages drawn between each two tapping points on the two arms and the other leg of the patient, and combining said first and second polar diagrams to form the component images of a stereoscopic vector diagram adapted for viewing in a stereoscopic device.

HANS ERICH HOLLMANN.